United States Patent [19]

Chien

[11] 4,072,210
[45] Feb. 7, 1978

[54] COMPRESSOR

[76] Inventor: Chao C. Chien, 1371 Whitehall Place, Westlake Village, Calif. 91361

[21] Appl. No.: 650,478

[22] Filed: Jan. 19, 1976

[51] Int. Cl.² ............................................. F16N 1/00
[52] U.S. Cl. ......................................... 184/5; 74/50; 417/534; 417/525; 308/3 R
[58] Field of Search ............. 184/5 TE, 100; 417/259, 417/262, 525, 534; 74/49, 50 R; 308/3 R

[56] References Cited

U.S. PATENT DOCUMENTS

| 287,697 | 10/1883 | Marchand | 73/239 |
|---|---|---|---|
| 899,541 | 9/1908 | Kirkwood | 417/397 |
| 1,286,958 | 12/1918 | Dinesen | 74/50 |
| 1,448,020 | 3/1923 | Wishart et al. | 74/50 |
| 1,632,436 | 6/1927 | Dinesen | 417/525 |
| 2,404,079 | 7/1946 | Maniscalco et al. | 74/49 |
| 3,119,461 | 1/1964 | Enders | 184/5 |
| 3,233,554 | 2/1966 | Huber et al. | 417/262 |
| 3,350,143 | 10/1967 | Lichowsky | 308/3 R |
| 3,456,874 | 7/1969 | Graper | 417/534 |
| 3,478,956 | 11/1969 | Gosha | 417/534 |

*Primary Examiner*—Samuel Feinberg
*Attorney, Agent, or Firm*—Nilsson, Robbins, Dalgarn, Berliner, Carson & Wurst

[57] ABSTRACT

A compressor utilizing opposing cylinders and flap valves in which the configuration may be readily modified from compressor to vacuum operation by simple reversal of components. Convertibility is facilitated by a valve plate having apertures which connect opposed cylinders and a manifold channel to opposed end chambers. Reversible flap valves are mounted on the valve plates and on the pistons. Additionally, a Scotch-yoke type mechanism of novel construction is provided in which the slider is formed of porous bronze and in which lubricant-containing wick material is disposed in the slider normal to and within the crankpin bearing hole.

4 Claims, 10 Drawing Figures

COMPRESSOR

FIELD OF THE INVENTION

The field of art to which the invention pertains includes the fields of double-acting compressors and vacuum compressors, and the field of Scotch-yoke type mechanisms.

BACKGROUND AND SUMMARY OF THE INVENTION

There is a need in many and diverse fields for a small yet powerful and efficient air power source, whether for providing air pressure or for providing vacuum. Fluid compressors with such capabilities are known. See, for example, Maniscalco U.S. Pat. No. 2,114,719, but which involves complicated valving arrangements making the compressor inordinately large and expensive for many applications. Laerdal U.S. Pat. No. 3,499,601 discloses a compressor utilizing a double action valve of relatively simple construction but which does not yield itself to ready convertibility. Other patents of interest in this regard are Pribonic U.S. Pat. Nos. 3,151,805, Kirkwood 899,541, Shoemaker 2,477,093, Kanuch 2,680,347, Courtois 1,889,640, Lawhead 1,295,529 and Miller Defensive Publication T883011, but each relates to a mechanism which is sufficiently complicated in construction and limited in its convertibility as to not provide a device applicable for many uses contemplated herein.

A number of the foregoing patent references disclose utilization of a Scotch-yoke type of mechanism. Over the years, such a mechanism has been a favorite with designers and engineers. Its advantages are simplicity, ease of assembly and low cost. Basically, a Scotch-yoke mechanism comprises a reciprocating shaft to which is secured a transverse yoke, in combination with eccentric means guided within the yoke and reciprocated by means of a crankpin connected to a flywheel, or counterweight. As the flywheel rotates, the crankpin slider carried by it is constrained to reciprocate within the transverse yoke resulting in conversion of the rotary motion of the flywheel to reciprocating motion of the yoke. Satisfactory methods for lubricating a Scotch-yoke mechanism have not entirely been resolved. In particular, with the type of compressor contemplated herein, it is important that the interior of the compressor be kept as clean as possible from lubrication spray. Therefore, the use of a common grease packing is inappropriate. A number of prior suggestions have been made and one could make particular reference to the Enders U.S. Pat. Nos. 3,033,312, 3,119,460 and 3,162,267. However, the type of Scotch-yoke utilized in the Enders patents involves the use of a channel member requiring a degree of tolerance which would be desirable to decrease so as to enable as inexpensive construction as possible. Accordingly, the methods proposed for lubrication by the Enders patents are not applicable to the type of mechanism which is proposed herein. Other patents of minor interest with regard to lubrication are Campbell U.S. Pat. Nos. 3,590,957 and Russell 1,640,375.

The present invention provides a compressor having opposed coaxial cylinders at opposite ends and which is constructed for ready conversion to operate as a vacuum compressor. Advantageously, the foregoing is accomplished with a compressor of only modest size having relatively few components, which is inexpensive in construction and which does not require close tolerances for excellent operation. In comparison to compressors of a similar size which usually have a maximum efficiency of 35–40%, compressors constructed in accordance with the present invention can attain a peak compressor efficiency of up to 60%. The compressor is useful in a wide variety of applications ranging from an auto tire inflator which can be plugged into a cigarette lighter, as the pressure source of a load leveling pressure adjustable shock absorber, as a vacuum pump, for high pressure systems through staging, as a paint sprayer, as a water tank pressurizer, as a medical respirator and nebulizer, in computers as an air power source for small air motors, for inflating air bags and air shocks and for any other system requiring positive air pressure at high efficiency.

More specifically, the compressor comprises a housing including side walls and end walls (head plates) and defining first and second end chambers adjacent the end walls. A pair of cylinders are formed in the housing inwardly adjacent the end chambers and an open region is defined between the cylinders. In a preferred form of the invention, a manifold channel connects an exhaust port (or inlet port for vacuum operation) with the opposite end chambers.

A valve plate is disposed in each end chamber, each plate having an inner surface carrying hermetic seals to close the outer end of the cylinder thereat. A free space is left between the outer surface of the plate and the end wall of the housing. The valve plate is formed with an orifice aligned with the cylinder for communicating the cylinder with the free space and a flap valve is carried on the valve plate for opening and closing the orifice. In accordance with a particular embodiment herein for enabling the aforementioned convertibility, the valve plate extends across the outer end of the channel connected to the exhaust port and the plate is formed with an orifice aligned with that channel end so as to enable communication with the free space in the end chamber.

A piston is disposed in each cylinder and each piston is formed with an orifice so as to provide communication between the central open region and the interior region of the cylinder adjacent the respective valve plate. A flap valve is disposed on each piston for opening and closing the piston orifice. A mechanism acting as a "piston rod" is located in the open region and connects the two pistons for reciprocal movement, and means are provided for reciprocating the "piston rod" as a part of a Scotch-yoke type mechanism as will be hereinafter referred-to. By reversing the direction of the valve plates and disposing the piston flap valves on opposite sides, one can convert from one mode of operation to another with great facility. A motor can be mounted to the housing so that the facing of the motor encloses the central open region. Depending upon the mode of operation, vents are opened into the central region and filtration means are disposed in the vents as well as in the channels leading to the exhaust port, so as to provide dust and lint-free air.

In accordance with another particular embodiment of the invention, a Scotch-yoke type of mechanism is provided in which slider and yoke have mating cylindrical surfaces. Such construction provides inherent self-alignment so as to permit lower tolerances in manufacture and in assembly. The slider is constructed of lubricant-impregnated sintered or other porous bronze. A lubricant-containing cross hole is provided and the crankpin bearing hole extends past the cross hole across the slider. For extra long life, during construction, a lubricant-containing wick material is disposed in the cross hole and across the bearing hole. With the slider in place in the yoke, when the crankpin is inserted into the bearing hole it severs the wick material from the cross hole and displaces the severed wick material to the end of the bearing hole, against the yoke. The result is the provision of additional lubrication for both the inside surface of the yoke as well as the crankpin. The wick lubrication acts in conjunction with the lubricant-impregnated bronze to provide a unique lubrication mechanism having extremely long lubrication life, beyond that provided by the bronze slider alone.

DETAILED DESCRIPTION

As required, detailed illustrative embodiments of the invention are disclosed herein. However, it is to be understood that these embodiments merely exemplify the invention which may take forms that are different from the specific illustrative embodiments disclosed. Therefore, specific structural and functional details are not to be interpreted as necessarily limiting, but as a basis for the claims which define the scope of the invention.

Figure 1:
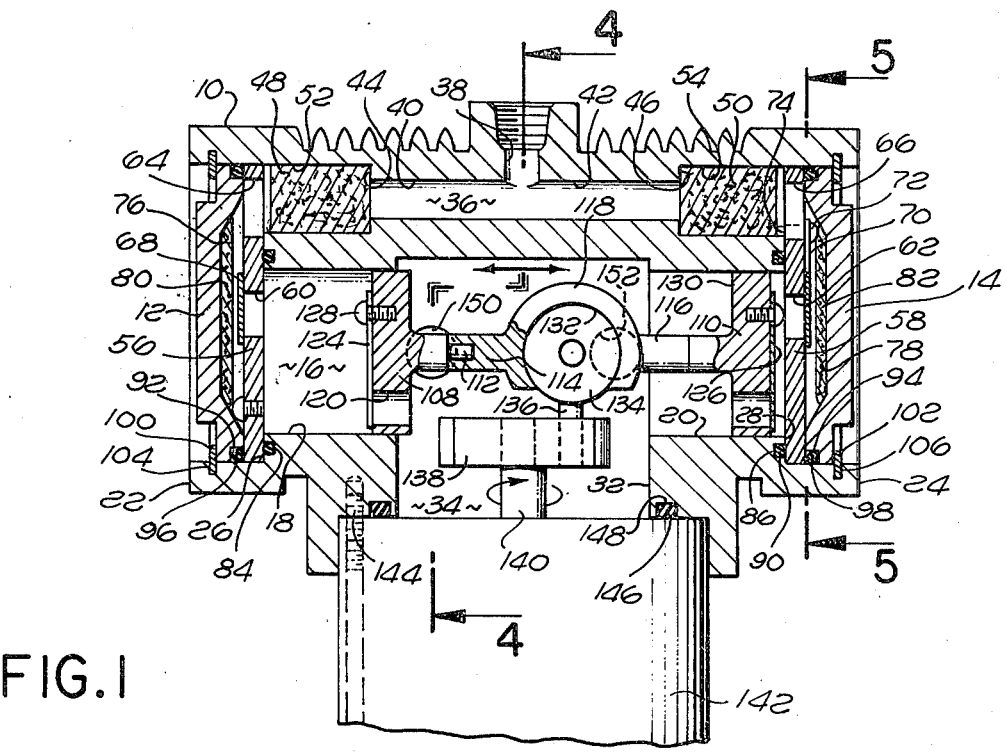
FIG. 1 is a cross-sectional view through one embodiment of the compressor according to the invention.

Referring to FIG. 1, a compressor in accordance with one embodiment of this invention is illustrated operating as a single stage compressor, but with double action to provide high flow volume. The compressor includes a housing 10 including detachable end walls (head plates) 12 and 14, as hereinafter described in more detail, and a side wall 16 which is generally cylindrical. In production, the housing is cast with the chambers formed somewhat smaller in diameter than desired and then drilled through. In such manner, cylinders 18 and 20 on opposite sides of the housing are countersunk from the respective terminal housing ends 22 and 24 so that shoulders 26 and 28, respectively, are formed spaced inwardly from the housing ends 22 and 24. The housing is formed with a base 30 (see FIG. 4) at one side through which is formed an opening 32 which extends from the side wall 16 of the housing thereat communicating with the cylinders 18 and 20 and defining an open region 34 between the compressor cylinders.

Figure 4:
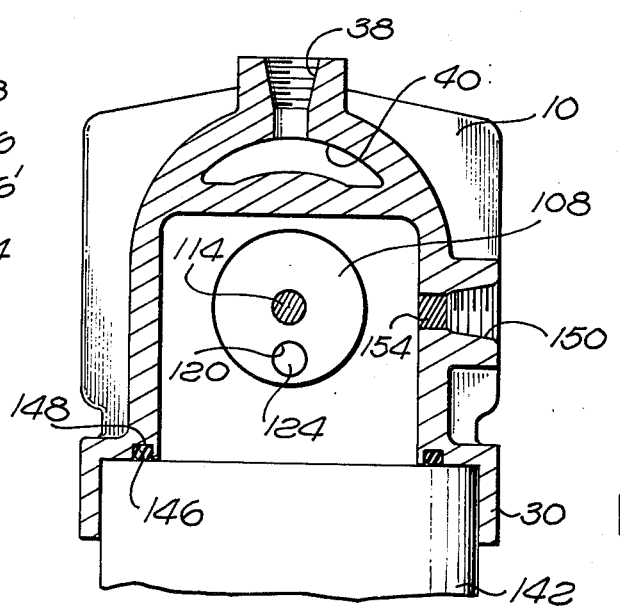
FIG. 4 is a view on line —4— of FIG. 1.
Figure 5:
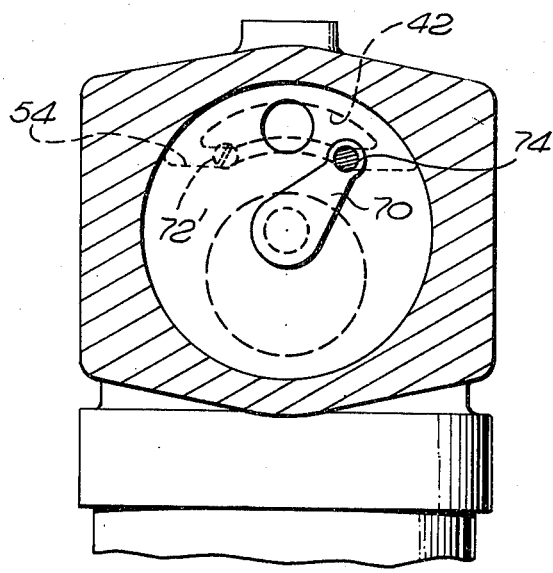
FIG. 5 is a view on line 5—5 of FIG. 1.

The housing also includes a manifold channel 36 and an exhaust port 38 through the housing side wall 16 thereat into the manifold channel. The manifold channel 36 includes a pair of oppositely directed legs 40 and 42 extending toward the end walls 12 and 14 and which terminate coplanar with the terminal ends of the cylinders 18 and 20. The outer ends of the channel legs 40 and 42 are each countersunk to form shoulders 44 and 46 so that a wad of filter and noise dampening material 48 and 50, such as polyester fiber, cotton, felt, or the like, can be located within the outer ends 52 and 54 of the channel legs. Referring momentarily to FIGS. 4 and 5, it will be seen that the channel legs 40 and 42 have an elongate arcuate shape with the outer ends 52 and 54 formed with a larger cross sectional area.

Referring back to FIG. 1, a pair of valve plates 56 and 58 are disposed against the shoulders 26 and 28, respectively, to close the outer ends of the cylinders 18 and 20. The valve plates 56 and 58 are identical in construction and each includes a central aperture 60 and 62 communicating with the respective cylinder. Additionally, each valve plate 56 and 58 includes an edge aperture 64 and 66, respectively, for alignment with the channel legs 40 and 42, respectively. Referring additionally momentarily to FIG. 5, each valve plate 56 and 58 carries a flap valve 68 and 70, respectively, on its outermost surface, secured thereto by means of a screw, such as at 72 (FIG. 1) threaded through the valve plate. The shank 74 of the screw 72 extends into the associated outer end 52 or 54 of the channel leg 40 or 42. The arcuate shape of the channel serves to enable one to readily locate and position the valve plate with its flap valve properly oriented, thereby facilitating assembly of the apparatus.

The end walls 12 and 14 are each formed with a concave inner surface 76 and 78, respectively, and noise dampening and filter material 80 and 82 is disposed in the concavity, secured to the end walls 12 and 14 by adhesive or the like and serving to further enable sound attenuation and air filtration. The cylinder shoulders 26 and 28 are each formed with annular grooves 84 and 86 around the cylinders in which are disposed O-ring seals 88 and 90, respectively. Similarly, grooves 92 and 94 are formed along the inner edges of the end walls 12 and 14 in which are disposed O-ring seals 96 and 98. With the O-rings in place, the end walls 12 and 14 are disposed against the outer surfaces of the valve plates 56 and 58, pressed thereagainst and secured in place by snap rings 100 and 102 disposed in grooves. The valve plates 56 and 58 are formed with flat inner surfaces so that they extend entirely across the pump cylinders and channel legs and, as a result of the O-ring seals and pressure securement, allow communication only through the central and edge apertures.

Referring additionally to FIG. 4, pistons 108 and 110 are disposed in the cylinders 18 and 20, respectively, close-fit therein, and which are press fit, as shown at 112 into the ends of associated "piston rods" 114 and 116, respectively. The "piston rods" 114 and 116 are extensions of the yoke 118 of a Scotch-yoke type mechanism, as will hereinafter be described in more detail. Each piston 108 and 110 is formed with an orifice 120 and 122 providing communication between the open region 34 and the cylinder interior adjacent the respective valve plate 56 and 58. A flap valve 124 and 126, of the type hereinbefore described, is mounted on the face of each piston 108 and 110 by means of a screw 128 and 130, respectively.

Figure 9:
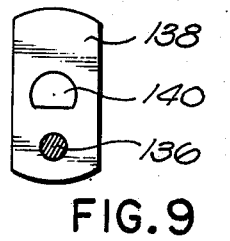
FIG. 9 is a view on line 9—9 of FIG. 6 illustrating the crankpin counterweight.

The yoke 118 of the Scotch-yoke type mechanism is open ended and is formed with a substantially cylindrical inner surface 132. A cylindrical slider 134 is matingly and slidably disposed within the yoke 118 and, referring additionally to FIG. 9, is reciprocated therein via a crankpin 136 eccentrically connected to one end of a counterweight 138. The counterweight 138 is keyed to the shaft 140 of a motor 142. Rotation of the motor shaft 140 results in reciprocation of the slider 134 into and out of the plane of the figure shown in FIG. 1, with resultant reciprocation normal thereto of the coaxial pistons 108 and 110. An advantage resulting from using a yoke and slider having mating cylindrical surfaces is that rotation of the slider about an axis normal to the plane of the drawing is allowed. Accordingly, a low level of engineering and assembly tolerances can be accomodated, enabling low manufacturing cost.

Advantageously, the housing of the motor 142 is mounted by bolts, as at 144 to the housing base 30 and sealed against an O-ring 146 carried in a groove 148 in the facing surface of the housing so as to enclose the central open region 34 as demanded by the particular mode of operation. Referring additionally to FIG. 4, a pair of vents 150 and 152 are formed through the side wall of the housing 10 to provide an air inlet into the open region 34, and filtration material 154 is disposed within each vent. The vents 150 and 152, as well as the exhaust port 138, are threaded for receiving the correspondingly threaded nib of a connecting tube, if desired. Alternatively, one can close off the vents or port by threading a closing cap therein, or by omission thereof, if desired for a specific purpose in accordance with one or more of the modifications as hereinafter described. Advantageously, the vents 150 and 152 are located directly across from the yoke 118 of the Scotch-yoke mechanism, thereby facilitating lubrication of that mechanism when desired.

Figure 2:
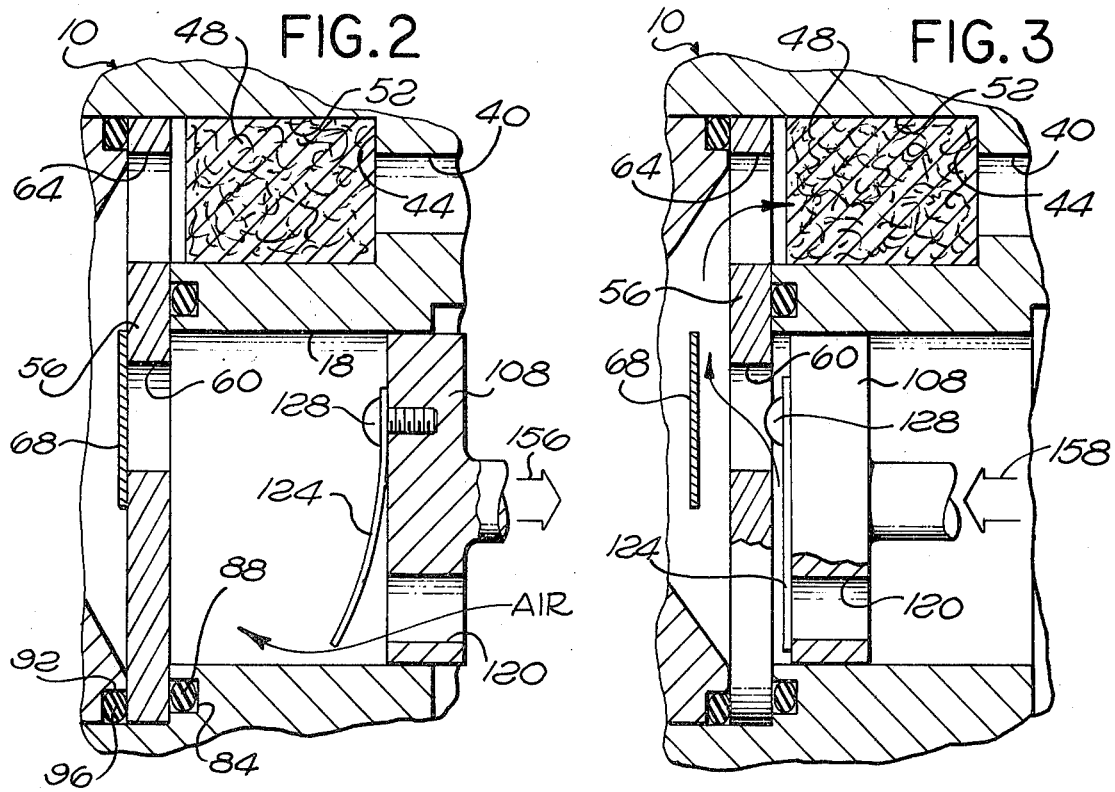
FIGS. 2 and 3 are enlarged sections of the cross-sectional representation of the compressor of FIG. 1 illustrating operation thereof.
Figure 3:
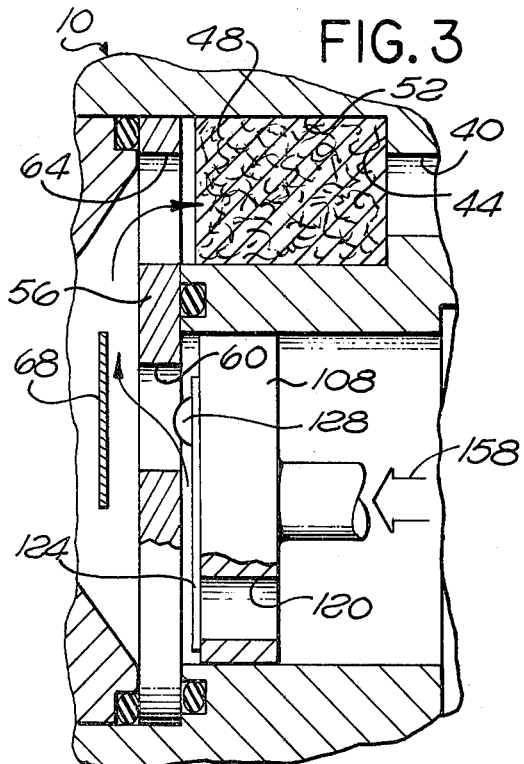

Referring now to FIGS. 2 and 3, operation of the valve is illustrated whereby upon piston movement to the right, as shown by the arrow 156, the flap valve 124 carried on the lefthand piston 108 opens to permit air to enter the lefthand chamber 18, whereas the flap valve 68 mounted on the exterior surface of the valve plate 56 prevents movement therethrough of air from the channel leg 40. In FIG. 3, when the piston 108 is moved in the opposite direction, as shown by the arrow 158, the flap valve 124 is closed forcing air out through the central aperture 60 of the valve plate 56, opening the flap valve 68 and permitting the air previously contained in the chamber 18 to be pushed through the edge aperture 64, through the filter material 48 and into the channel leg 40. Referring back to FIG. 1, the air escapes through the port 38. A corresponding action takes place at the opposite end of the compressor.

Figure 6:
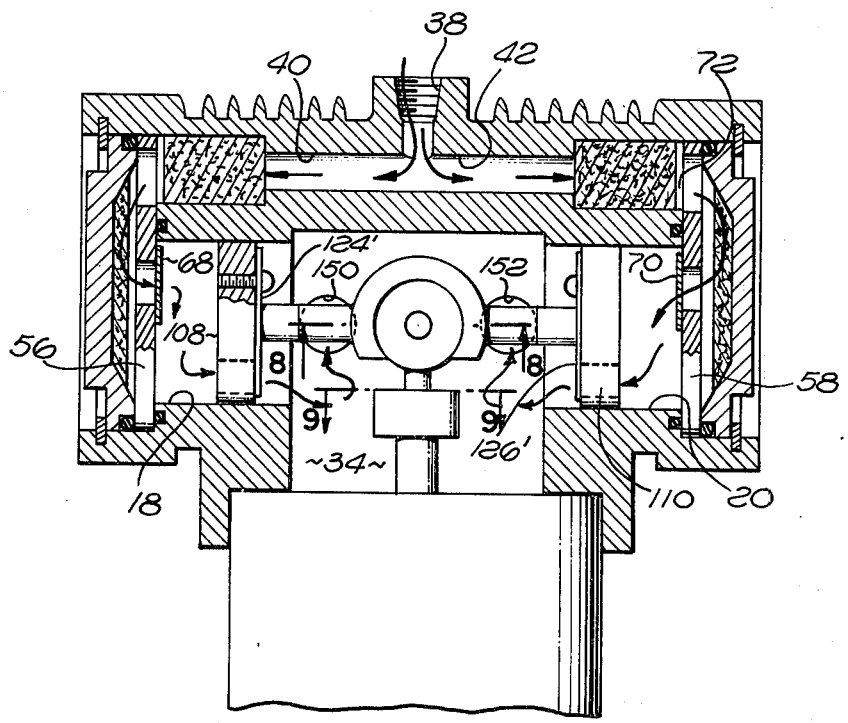
FIG. 6 is a cross-sectional view of the compressor of FIG. 1 with a reversal of flap valves in an embodiment providing a vacuum compressor operation.

Referring now to FIG. 6, an apparatus is shown which is similar to that of FIG. 1 except that the disposition of the valves is reversed so as to provide a vacuum compressor. In fact, the identical apparatus can be used with minor modification by simply reversing the disposition of the valve plates 56 and 58. Accordingly, the flap valves 68 and 70 are located within the respective compressor cylinders 18 and 20. As a result of the elongate arcuate structure of the channel legs 40 and 42, the head of the retaining screw 72 is retained within the corresponding outer ends of the channel legs, rather than the shank 74 as in FIG. 1. Referring to FIG. 5, the location of the screw head is indicated by the numeral 72' and it is seen that it is located within the outer end of the channel leg at a position symmetrically opposite to the disposition of the screw shank 74 in the embodiment of FIGS. 1 and 5.

In operation, during reciprocation of the pistons 108 and 110, air is drawn in through the port 38, which in this case can be referred to as an inlet port, and distributed alternately to the compressor cylinders 18 and 20, through the apertures therein and into the open space 34 for escaping out of the (now exhaust) vents 150 and 152.

Figure 7:
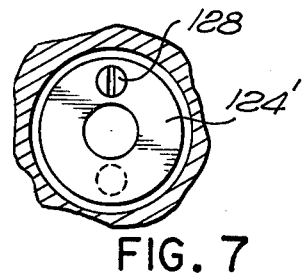
FIG. 7 is a view illustrating a circular flap valve.

Referring additionally to FIG. 7, in the embodiment illustrated in FIG. 6, a minor modification must be made to permit the piston flap valves 124' and 126' to be operative. In this case, the flap valve, such as 124', is circular, in the form of a ring secured by the screw 128 to the inner surface of the piston. The circular flap valve 124' can be substituted for the "finger" valve 124 utilized in FIG. 1 if it is desired to have a uniformity of parts for both configurations.

Figure 8:
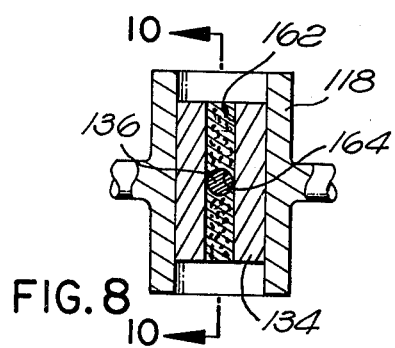
FIG. 8 is a view on line 8—8 of FIG. 6 showing a Scotch-yoke mechanism of the present invention in cross section.
Figure 10:
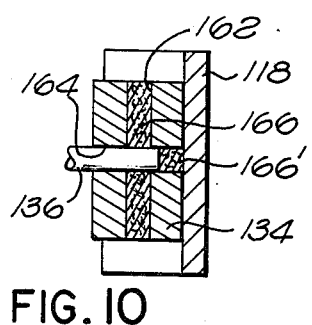
FIG. 10 is a view on line 10—10 of FIG. 8 showing details of a lubrication wick embodiment of the present invention.

Referring now to FIG. 8, further details of the construction of the Scotch-yoke type mechanism is illustrated. The slider 134 is formed with a cross hole 162 entirely therethrough and across the bearing hole 164 into which is disposed the crankpin 136. The slider can be advantageously constructed of oil-impregnated bronze to provide long lubrication life. In accordance with an embodiment of the invention, for extra long mechanical life, lubricant material is placed in the bearing hole between the crankpin 136 and inner surface of the yoke 118. Referring to FIG. 10, initially the cross hole 162 is entirely filled with lubricant-containing wick material 166 which can be of polyester, felt, or the like, and the bearing hole 164 is formed normal to the cross hole and through the slider 134. In assembly, the slider 134 is disposed in the yoke 118 and the crankpin 136 is inserted into the bearing hole which serves to sever the wick material from the cross hole and displace the severed wick material 166' to the end of the bearing hole 164 against the inner surface of the yoke 118. The result is further lubrication for the inner yoke surface as well as for the crankpin.

It will be appreciated that various modifications can be made to the present invention without departing from the spirit of the invention as defined by the appended claims.

I claim:

1. In a Scotch-yoke type of mechanism, having a reciprocating yoke, a slider in said yoke and a bearing hole for a crankpin, the improvement wherein said slider is constructed of lubricant-impregnated porous solid, bearing material and is formed with a cross hole normal to and across said bearing hole, one end of said bearing hole terminating past said cross hole and through said slider, and wherein lubricant-containing wick material is disposed in said cross hole with a portion of said wick material disposed at said bearing hole end for additional lubrication of said slider and yoke thereat.

2. The improvement of claim 1 in which said yoke and slider have mating cylindrical surfaces.

3. The improvement of claim 1 wherein said solid bearing material is bronze.

4. A method of constructing the slider of a Scotch-yoke, comprising:
   drilling holes through and into said slider to form a bearing hole for a crankpin and a cross hole through said slider normal to and across said bearing hole whereby said bearing hole terminates past said cross hole and through said slider;
   disposing said slider in said yoke;
   disposing lubricant-containing wick material in said cross hole and across said bearing hole; and
   inserting a pin into said bearing hole, thereby severing wick material from said cross hole and displacing said severed wick material to the end of said bearing hole for providing additional lubrication of the inner surface of said yoke.

* * * * *